US009253393B2

(12) United States Patent
Gillet et al.

(10) Patent No.: US 9,253,393 B2
(45) Date of Patent: *Feb. 2, 2016

(54) TWO-DIMENSIONAL IMAGER WITH SOLID-STATE AUTO-FOCUS (71) Applicant: Intermec IP Corp., Fort Mill, SC (US)

(72) Inventors: Alain Gillet, Toulouse (FR); Serge Thuries, Saint Jean (FR)

(73) Assignee: Intermec IP, Corp., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,550

(22) Filed: Mar. 9, 2015

(65) Prior Publication Data

US 2015/0181109 A1 Jun. 25, 2015

Related U.S. Application Data (63) Continuation of application No. 13/430,501, filed on Mar. 26, 2012, now Pat. No. 8,988,590.

(60) Provisional application No. 61/468,104, filed on Mar. 28, 2011.

(51) Int. Cl.
*H04N 5/232* (2006.01)
*G03B 13/36* (2006.01)
*H04N 5/355* (2011.01)
*H04N 5/357* (2011.01)
*G06K 7/10* (2006.01)
*H04N 9/04* (2006.01)
(Continued)

(52) U.S. Cl.
CPC ............ *H04N 5/23212* (2013.01); *G03B 13/36* (2013.01); *G06K 7/10831* (2013.01); *H04N 5/3572* (2013.01); *H04N 5/35536* (2013.01); *H04N 5/35572* (2013.01); *H04N 9/045* (2013.01); *G02B 5/201* (2013.01); *G02B 13/24* (2013.01); *G02B 26/106* (2013.01); *G02B 27/0025* (2013.01)

(58) Field of Classification Search
None
See application file for complete search history.

(56) References Cited

U.S. PATENT DOCUMENTS 3,971,065 A 7/1976 Bayer
5,359,185 A 10/1994 Hanson
(Continued)

FOREIGN PATENT DOCUMENTS

EP 2779027 A1 9/2014
WO 2006095110 A2 9/2006
WO 2007015059 A1 2/2007

OTHER PUBLICATIONS

"YUV," from Wikipedia. <http://en.wikipedia.org/wiki/YUV>, accessed on Jun. 29, 2012; 10 pages. Submitted in Previous Related Application.

(Continued)

*Primary Examiner* — Albert Cutler
(74) *Attorney, Agent, or Firm* — Additon, Higgins & Pendleton, P.A.

(57) ABSTRACT

An imaging system having a solid-state auto focusing system advantageously images broadband light reflected from an object to be imaged using a lens objective having chromatic aberration, which focuses different colors of light at different focal planes. Using the color information in the focal planes in conjunction with an object distance determined by a range finder, a luminance plane is constructed that has a focused image of the object. The system provides the focused image of the object without the use of any moving parts.

18 Claims, 8 Drawing Sheets (51) Int. Cl.
  G02B 5/20    (2006.01)
  G02B 26/10   (2006.01)
  G02B 13/24   (2006.01)
  G02B 27/00   (2006.01)

(56) References Cited

U.S. PATENT DOCUMENTS

| | | | |
|---|---|---|---|
| 8,305,458 B2* | 11/2012 | Hara | 348/222.1 |
| 8,339,462 B2 | 12/2012 | Stec et al. | |
| 8,437,539 B2 | 5/2013 | Komatsu et al. | |
| 8,988,590 B2 | 3/2015 | Gillet et al. | |
| 2002/0079370 A1* | 6/2002 | Wood et al. | 235/454 |
| 2004/0096118 A1* | 5/2004 | Liang | 382/284 |
| 2004/0165090 A1 | 8/2004 | Ning | |
| 2006/0232681 A1* | 10/2006 | Okada | 348/222.1 |
| 2008/0031610 A1* | 2/2008 | Border et al. | 396/89 |
| 2008/0212168 A1* | 9/2008 | Olmstead et al. | 359/355 |

OTHER PUBLICATIONS

"YUV pixel formats," <http://www.fourcc.org/yuv.php>, accessed on Jun. 29, 2012; 13 pages.

"YUV to RGB Conversion," <http://www.fourcc.org/fccyvrgb.php>, accessed on Jun. 29, 2012; 5 pages.

European Patent Office Action for Application No. 14157971.4-1906, Dated Jul. 16, 2014, 5 pages.

European Patent Search Report for Application No. 14157971.4-1906, Dated Jun. 30, 2014, 6 pages.

Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.

Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.

Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.

Proesmans, Marc et al. "Active Acquisition of 3D Shape for Moving Objects" 0-7803-3258-X/96 1996 IEEE; 4 pages.

Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.

* cited by examiner

TWO-DIMENSIONAL IMAGER WITH SOLID-STATE AUTO-FOCUS

CROSS-REFERENCE TO RELATED APPLICATIONS

The present application claims the benefit of U.S. patent application Ser. No. 13/430,501 for a Two-Dimensional Imager with Solid-State Autofocus filed Mar. 26, 2012 (and published Mar. 7, 2013 as U.S. Patent Application Publication No. 2013/0057753), now U.S. Pat. No. 8,988,590, which claims the benefit of U.S. Provisional Application No. 61/468,401 for a Two-Dimensional Imager with Solid-State Autofocus filed Mar. 28, 2011. Each of the foregoing patent applications, patent publication, and patent is hereby incorporated by reference in its entirety.

BACKGROUND

Conventional two-dimensional area imagers employ auto-focus devices to accommodate a wide range of reading distances. The auto-focus devices are typically based upon either a moving lens or a moving image plane that physically changes the focal plane of the optical system. These auto-focus devices with moving parts can suffer from several drawbacks such as wear-and-tear, increased drain on batteries when implemented in portable devices, and a need for recalibration of the moving parts.

DETAILED DESCRIPTION

Chromatic aberration is a lens distortion that arises due to dispersion, i.e., a variation of the refractive index of the lens material as a function of wavelength. As a result, the lens focuses different wavelengths of light at different focal distances. An optical reader that uses a lens with chromatic aberration in conjunction with three different colored lights that fire sequentially can improve the depth of focus of the reader. However, expensive electronics are needed to implement this type of reader.

A two-dimensional imaging system having a solid-state auto focusing system is described. The system advantageously uses chromatic aberration inherent in optical lenses with a broadband light source to focus different colors of light at different focal planes. Additionally, the distance from the imaging system to the object to be imaged can be determined by an independent light beam. By using the distance information with color information in different focal planes, a luminance plane can be constructed and used to auto focus the imaging system without any moving parts.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Typically, a white light source, such as a white light emitting diode (LED), is used in an optical reader for illuminating a barcode or other machine-readable symbol to be read, and a lens focuses light received from the target object. With conventional imaging systems, it is desirable to minimize the amount of chromatic aberration in the lens. The techniques to be presented below advantageously use the chromatic aberration in the objective lens to reconstruct a luminance plane for auto-focusing the imaging system.

Figure 1A:
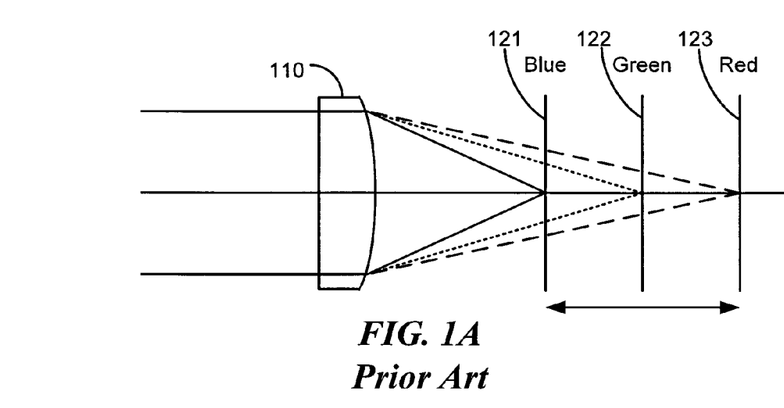
FIG. 1A depicts the focal planes for three representative colors, blue, green, and red for a lens with dispersion that causes the refractive index to decrease with increasing wavelength.

A lens with inherent material dispersion focuses different wavelength components of white light at different focal planes. With conventional types of glasses that are used for making lenses, the dispersion causes the refractive index to decrease with increasing wavelength. Thus, for a positive lens, the longer wavelengths of light are focused farther away from the lens. FIG. 1A depicts a lens 110 and corresponding focal planes for three representative colors, blue (121) (shortest wavelengths), green (122), and red (123) (longest wavelengths). White light LEDs emit more power in the longer wavelength (blue) portion of the spectrum than in the shorter wavelength (red) portion of the spectrum, thus the material dispersion of a typical lens results in the higher power blue light being focused in the near field. However, it is beneficial to direct more light power into the far field in order to maintain a more even power distribution in the scan range because light power decreases with distance. Thus, it is desirable to reverse the chromatic aberration to focus the blue light in the far field.

Figure 1B:
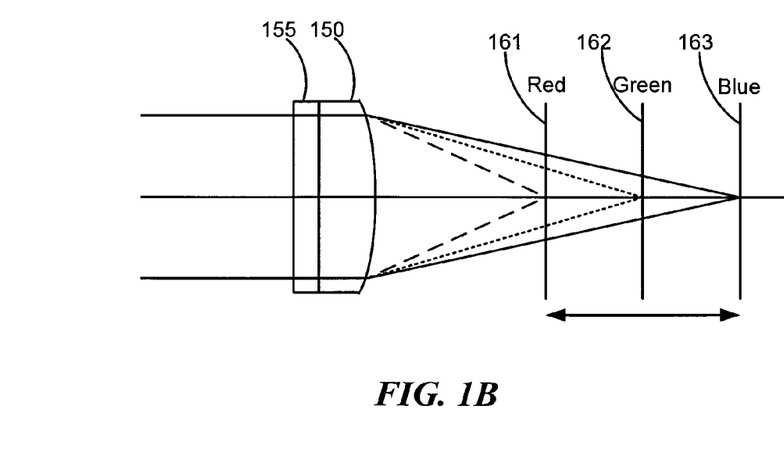
FIG. 1B depicts the focal planes for a lens combination that causes the refractive index to increase with increasing wavelength for three representative colors, blue, green, and red.

One method of reversing chromatic aberration is to use two or more lenses which together result in negative chromatic aberration but still maintains a positive focal length. In one example, a first lens is made from crown glass, and a second lens is made from flint glass. The combination of the lenses reverses the order in which the wavelengths of light are focused. In another example, a hologram lens can be used as the second lens. FIG. 1B depicts a combination lens that comprises an objective lens 150 and a hologram lens 155. The objective lens 150 has a dispersion that causes chromatic aberration. The hologram lens 155 is used to apply dispersion to the light to be imaged that is opposite in sign to the dispersion of the objective lens 150. The order of the focal planes for the combination lens for the three representative colors blue (163), green (162), and red (161) is reversed as compared to the order of the focal planes shown in FIG. 1A. In either of the above examples, the dispersion of the second lens combined with the objective lens 150 should be large enough to spread the focal planes of the red and blue wavelengths, where the red wavelengths are focused more strongly than the blue wavelengths. However, the combined dispersion of the lenses cannot be too large otherwise there will be gaps in the reading between the color planes which will prevent the machine-readable symbols from being accurately read.

Figure 2A:
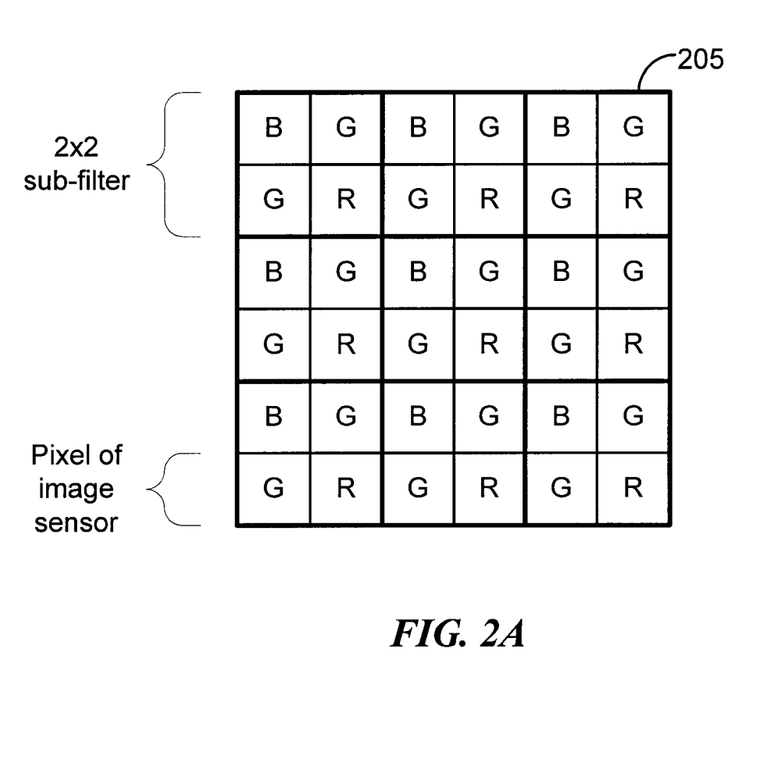
FIG. 2A shows a Bayer filter.

Because the objective lens combination has sufficient chromatic aberration to separate the focal planes of the different wavelengths of light, a color filter array can be used advantageously with a white light source to analyze the different wavelengths of light reflected from the target object to auto-focus the system. One non-limiting example of a color filter array is a Bayer filter 205, as shown in FIG. 2A. The Bayer filter is a square grid of red, green, and blue color filters, where each filter overlays a single pixel or photosensor of a two-dimensional imaging array. In the first row of the Bayer filter, blue and green filters alternate, and in the second row of the Bayer filter, green and red filters alternate. The pattern in the first two rows of the filter is repeated through the rest of the rows of the filter. Essentially, the Bayer filter is made up of grids of 2×2 sub-filters repeated over the entire filter, and each 2×2 sub-filter has two green filters, one blue filter, and one red filter. Other color filter arrays having a different number of color filters can also be used.

Figure 2B:
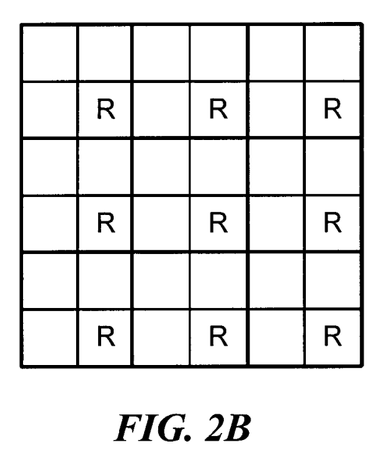
FIGS. 2B-2D show the sensor pixels in the imaging array for the filtered colors.
Figure 2C:
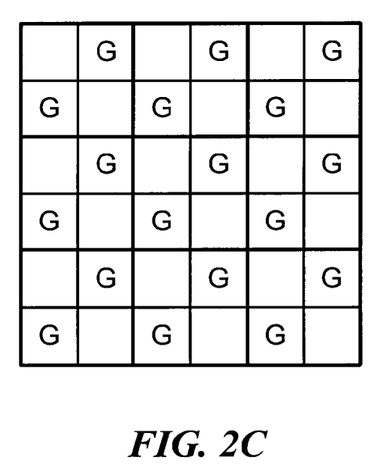
Figure 2D:
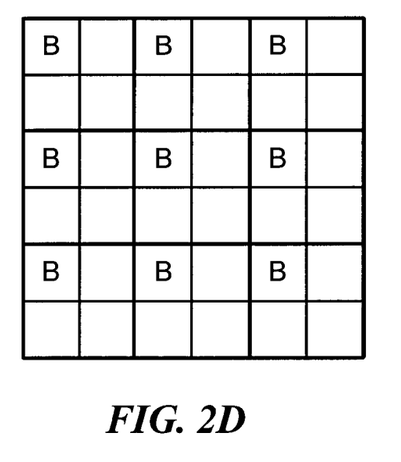

The raw data for the red focal plane is captured in the sensor pixels corresponding to the red filters, as shown in FIG. 2B. Similarly, the data for the green and blue focal planes are captured by the corresponding sensor pixels, as shown in FIGS. 2C and 2D, respectively. Because the Bayer filter does not provide data for each color plane at each pixel of the sensor, the missing data should be reconstructed using a de-mosaicing algorithm. Those skilled in the art will be familiar with de-mosaicing algorithms, ranging from a simple 'nearest-neighbor' technique to other more complex algorithms such as bi-cubic or spline interpolation.

To accurately determine appropriate de-mosaicing parameters, a range finder can be used to measure the distance from the imaging system to the target. In one embodiment, an optical aiming system, for example a laser beam that has a different axis from the main imaging optical axis, is used as a range finder. Such optical aiming systems are common in some existing imagers. As a result of parallax between the two optical axes, the position of the spot produced on the image by the aiming system can be triangulated to determine the distance from the imaging system to the target. Although the precision of the measurement decreases with the square of the reading distance, it is more than sufficient to tune the de-mosaicing algorithm quite accurately, especially for imagers designed to read symbols at close range (e.g. under one meter) or even at mid-range distances. The amount of light used to read a target ultimately limits the range of auto-focus that can be achieved with this technique. With conventional light sources, a practical limit to the auto-focus range that can be achieved is about a meter.

One alternative to using a color filter array with wide spectrum lighting is to use a wide spectrum image sensor with different monochromatic or narrow wavelength band illumination sources, for example, different color LEDs. Then de-mosaicing of the image data is not needed, but this comes at the expense of using additional lighting sources.

Figure 3:
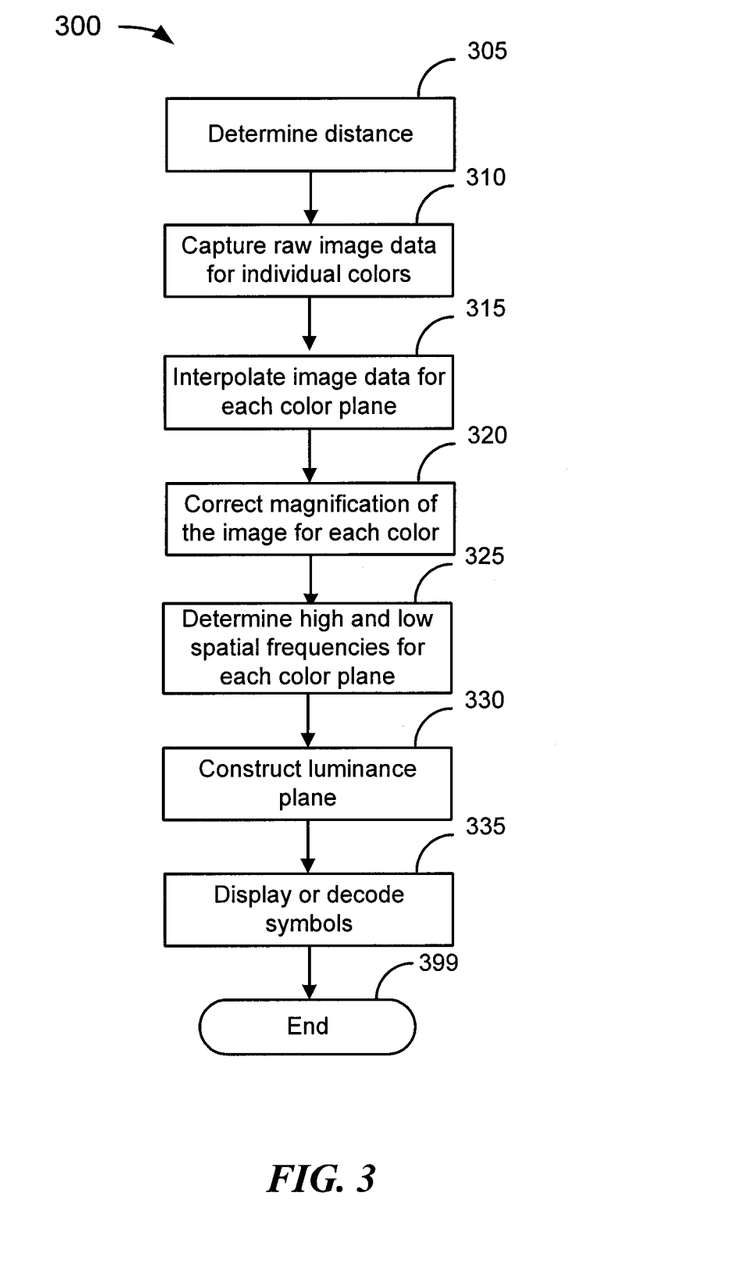
FIG. 3 is a flow diagram illustrating an example process of autofocusing an imaging system by constructing a luminance plane.

FIG. 3 is a flow diagram illustrating an example process 300 of reading a machine-readable object with a solid-state auto-focusing imaging system. At block 305, the system determines the distance to the object to be read. A range finder, such as a laser beam, can be used.

In one embodiment, the distance information obtained from the range finder can optionally be used to adjust an aperture in the optical system, i.e., the aperture can be reduced for closer targets to obtain better resolution, while the aperture can be increased for targets at farther distances to permit more light to be gathered.

At block 310, the system captures the raw image data for the individual colors to be analyzed. In one example, image data for three colors can be captured, for example, red, green, and blue using a Bayer filter, as described above. However, image data for any three color planes can be captured. Moreover, image data for more or fewer colors can be captured. Using four color planes would provide better information for auto-focusing the system, however three colors may be more easily implemented because there are many commonly available components that support this configuration. It is desirable to capture the green image data because the green focal plane is very similar to the luminance plane as a result of the sensitivity of the human eye to green wavelengths around 555 nm. By including the green image data, an image of the target object can be reproduced for display to a user.

At block 315, the system interpolates the image data for each captured color plane by using a de-mosaicing algorithm. For example, gaps in the red or blue image data obtained with a Bayer filter can be filled-in using a bi-linear or bi-cubic interpolation, and gaps in the green image data can be filled-in using an edge sensitive bi-linear interpolation. As will be appreciated by those skilled in the art, other de-mosaicing algorithms can also be used.

Because each of the different colors is focused in a different focal plane, each of the focal planes has a different magnification. At block 320, the system corrects the magnification of the images for each of the colors such that each image of the object has the same height. The value of the magnification is calculated using an optical design program and known parameters for the objective lens combination.

Next, at block 325 the system determines the high and low spatial frequencies from the image data for each color plane. All spatial frequencies present in each color plane are classified as either a high spatial frequency or a low spatial frequency, depending on whether the frequency is above or below a boundary frequency. In one example, the boundary frequency can be ⅓ or ¼ of the Nyquist frequency. However, the boundary frequency can be chosen to be higher or lower. Once the boundary frequency is selected, each color plane can be decomposed and expressed as the sum of the high frequency contributions of the color plane and the low frequency contributions of the color plane, as shown in equations (1):

$$G => G_H + G_L$$

$$R => R_H + R_L$$

$$B => B_H + B_L, \qquad (1)$$

where G, R, and B represent the raw image data for the green, red, and blue color planes, respectively, and $G_H$, $R_H$, $B_H$ are the values of the high spatial frequency contributions for the green, red, and blue planes, respectively, and $G_L$, $R_L$, $B_L$ are the values of the low spatial frequency contributions for the green, red, and blue planes, respectively.

One method for extracting the low spatial frequencies is to use a Gaussian binomial filter which acts as a low pass filter. To extract the high spatial frequencies, one method is to use an unsharp mask filter which operates to enhance high spatial filter detail at the expense of low spatial frequency information. Those skilled in the art will be familiar with various other filters or methods that can be used for extracting high and/or low spatial frequencies from image data.

The color planes are decomposed into the high and low spatial frequencies of the respective color plane because when the imaging system reads a barcode or other machine-readable symbol, the barcode or symbol information is primarily high spatial frequency information. Thus, in order to auto-focus the imaging system, it is important to determine for each color the dependence of the high spatial frequency information on the distance to the target object.

Then at block 330, the system constructs a luminance plane from the captured image data. Color space can be defined by the YUV model, where Y is the luminance component, and U and V are the chrominance or color components. The luminance plane, or Y plane, is a linear combination of the high spatial frequencies and the low spatial frequencies of the three color planes as shown in equation (2):

$$Y = \alpha G_H + \beta R_H + \gamma B_H + \delta G_L + \epsilon R_L + \eta B_L, \quad (2)$$

where the coefficients $\alpha$, $\beta$, $\gamma$, $\delta$, $\epsilon$, and $\eta$ are the respective contributions of the $G_H$, $R_H$, $B_H$, $G_L$, $R_L$, and $B_L$ color planes to the luminance of the image of the target. The coefficients vary as a function of the object distance.

The low frequency contributions from the red and blue color planes are not as important, and in one embodiment, the coefficients $\epsilon$ and $\eta$ that specify contributions for the low spatial frequencies from the red and blue planes, respectively, can be set to zero. However, the low spatial frequencies in the green plane provide needed luminance information because the green color plane is very close to the luminance plane in color space as a result of the human eye being most sensitive to green wavelengths near 555 nm. The coefficient $\delta$ for the low frequency contributions from the green color plane is equal to $(1-\alpha)$. For a standard conversion from the RGB color plane to the YUV color plane, the conversion formula for the luminance is given by $Y=0.587\ G+0.299\ R+0.114\ B$, where G, R, and B are the contributions from the green, red, and blue planes, respectively, and $\alpha=0.587$, $\beta=0.299$ and $\gamma=0.114$. However, for auto-focusing the imaging system, the coefficients for $\alpha$, $\beta$, and $\gamma$ in equation (2) are different from the standard values and should be determined empirically.

Figure 4:
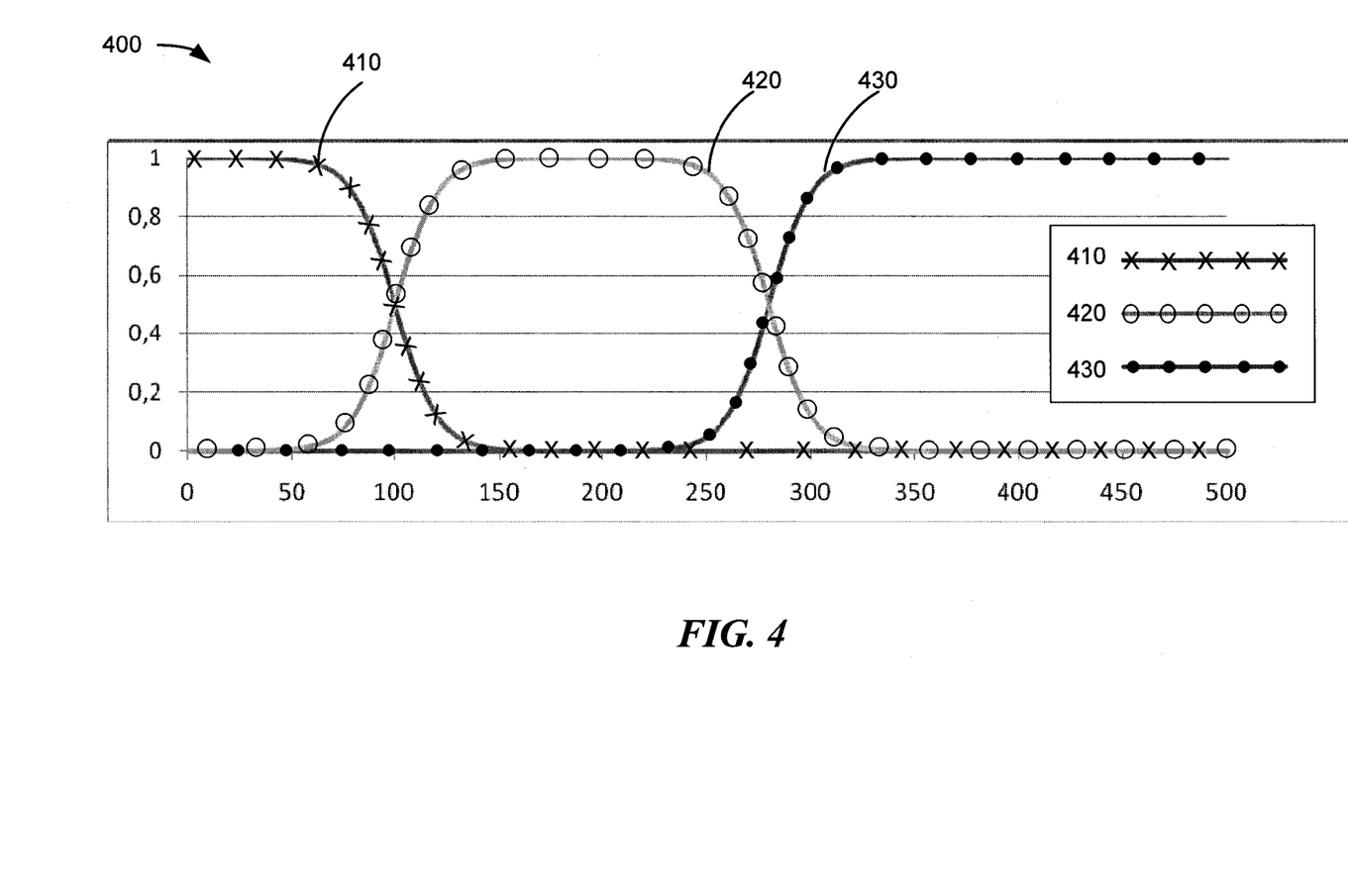
FIG. 4 is a conceptual graph of example curves of contributions of high spatial frequencies of different color planes to the luminance plane.

One example of the dependence of the coefficients for the high spatial frequencies of the color planes, $\alpha$, $\beta$, and $\gamma$, on object distance is shown in FIG. 4. The curves for $\alpha$(420), $\beta$(430) and $\gamma$(410) as a function of object distance are shown. Note that for the far field (farther object distance), the coefficient $\beta$ for the red color-plane is zero, while for the near field (closer object distance), the coefficient $\gamma$ for the blue color-plane is zero. These values are consistent with the diagram shown in FIG. 1B where the longer red wavelengths are focused in the near field, and the shorter blue wavelengths are focused in the far field. For different systems, the slopes of the curves for the coefficients and the points at which the curves cross can vary from the example curves shown in FIG. 4.

Figure 5:
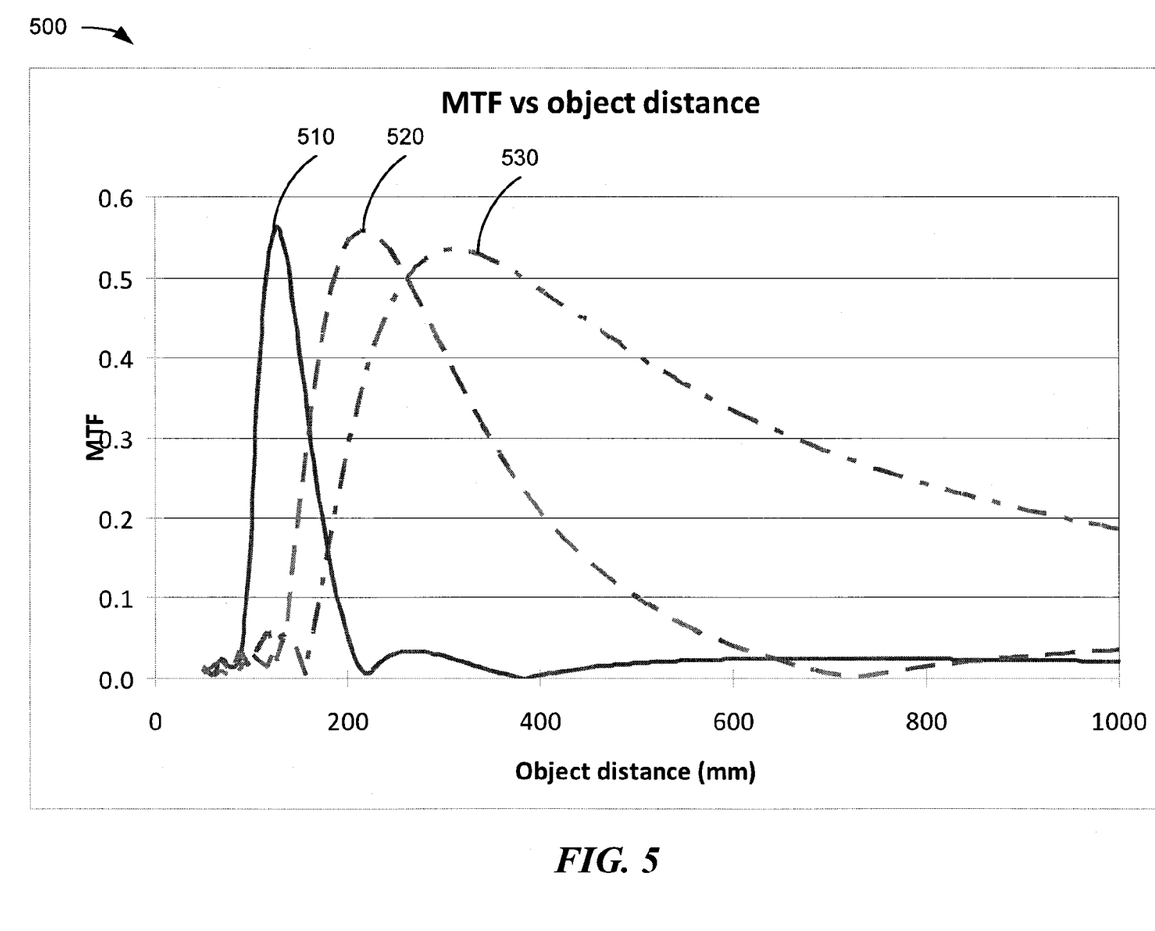
FIG. 5 is a graph obtained from computer simulations that shows example curves of the modulation transfer function (MTF) for different color planes as a function of object distance.

One way to determine how much each color plane should contribute to the total luminance Y is to generate computer simulations of the system performance for each of the color planes and analyze the contribution of each color plane as a function of object distance. A simulation that is a useful guide for performing the analysis of the color plane contributions is the modulation transfer function (MTF) plotted as a function of object distance for each of the color planes. Examples of MTF curves are shown in FIG. 5 for the blue color plane (510), the green color plane (520), and the red color plane (530). In one embodiment, the object distances corresponding to the peaks of the MTF curves for the different color planes can be used to adjust the curves for the coefficients as a function of object distance. Because the coefficients $\alpha$, $\beta$, and $\gamma$ are dependent upon the object distance, the distance between the imaging system and the target obtained at block 305 is used to determine the values of the coefficients for the particular object being imaged. The corresponding coefficients are then used to construct the luminance plane for the object.

The constructed luminance plane which includes information from the high spatial frequencies of the three color planes should be sufficient to recover the target symbol being imaged. Empirically, it has been determined that only approximately 10% modulation transfer function is needed to recover a bar code from the image data using this method.

Then at block 335, the system can display the luminance plane which has a focused image of the target. Alternatively, or additionally, the system can analyze the luminance plane to decode the barcode or other machine-readable symbol that has been imaged, print the luminance plane, or transmit the data for the luminance plane for further processing. The process ends at block 399.

Figure 6:
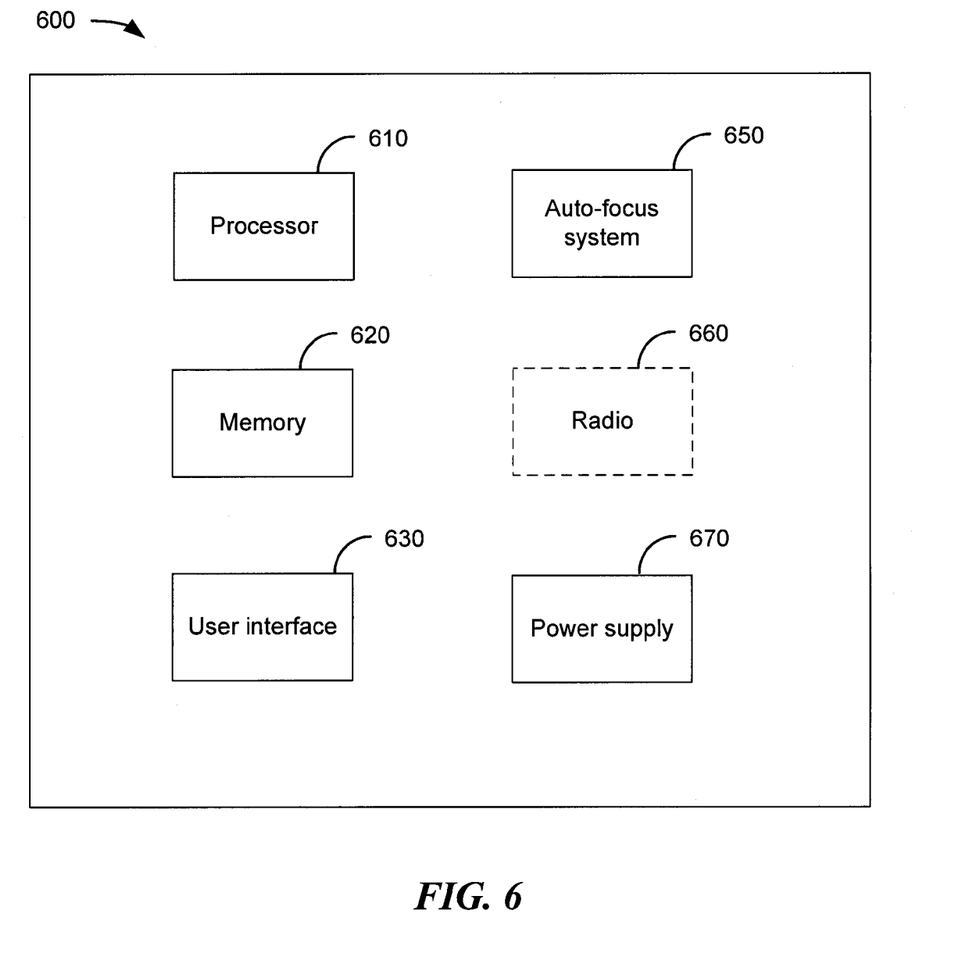
FIG. 6 shows a block diagram of an imager used to read barcodes or other machine-readable symbols.

FIG. 6 shows a block diagram 600 of an imager used to read barcodes or other machine-readable symbols. An imager can include one or more processors 610, memory units 620, user interface 630, auto-focus system 650, radio 660, and power supply 670.

A processor 610 can be used to run imager applications. Memory 620 can include but is not limited to, RAM, ROM, and any combination of volatile and non-volatile memory. A power supply 670 can include, but is not limited to, a battery. A user interface 630 can include, but is not limited to, triggers to start and stop the imager or to initiate other imager functions, visual displays, speakers, and communication devices that operate through wired or wireless communications. A radio 660 includes standard components for communication. The solid state auto-focus system 650 focuses the imager without any moving parts.

Figure 7:
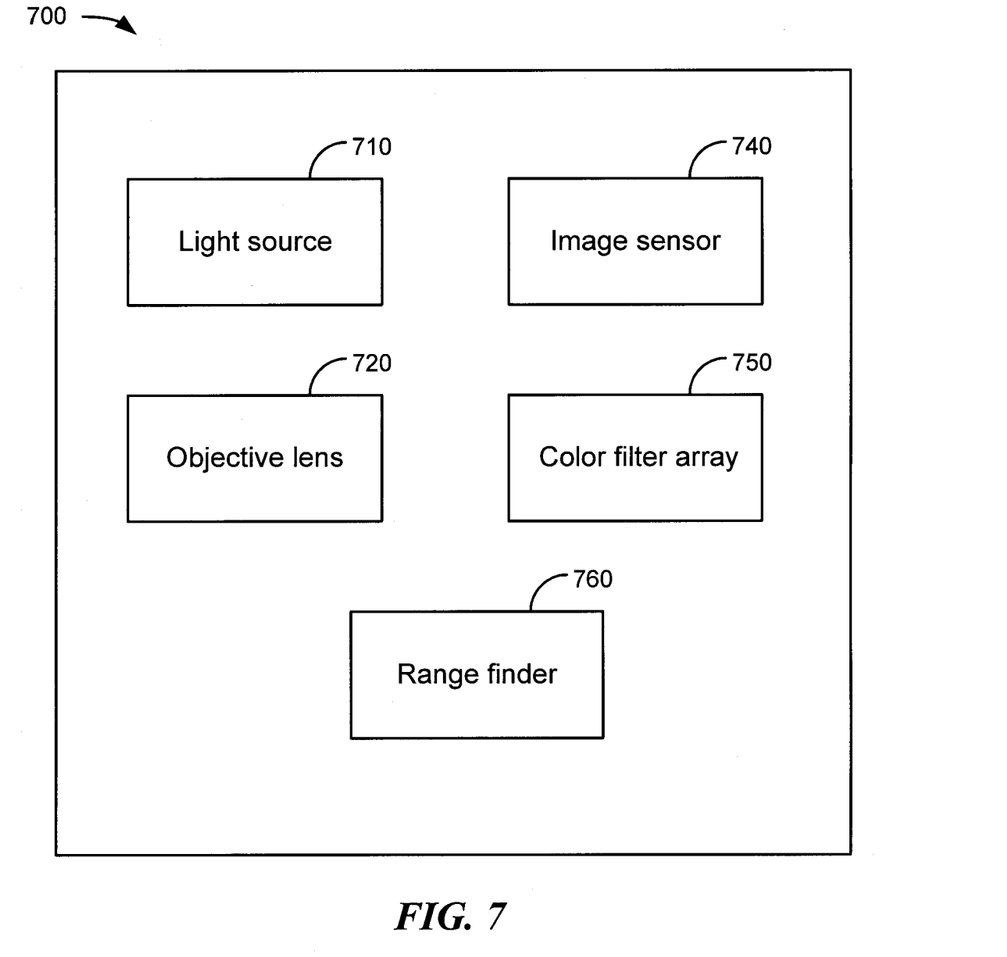
FIG. 7 shows a block diagram of a solid-state auto-focus subsystem of an imager used to read barcodes or other machine-readable symbols.

FIG. 7 shows a block diagram of the solid state auto-focus system 700. The auto-focus system 700 can include a light source 710, an objective lens 720, image sensor 740, color filter array 750, and range finder 760.

The light source 710 is used to illuminate the target object and can be a broad spectrum light source, such as a white light source. The objective lens 720 is any combination of optics that provides a sufficiently strong chromatic aberration that focuses light having longer wavelengths more than light having shorter wavelengths.

The image sensor 740 captures light from a target object focused by the objective lens 720. The color filter array 750 transmits only certain wavelengths of light such that the image sensor 740 only captures light in a fixed wavelength range on certain pixels. The range finder 760 is used to determine the distance from the imager to the target object.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

The invention claimed is:

1. An imaging apparatus, comprising:
    a broadband light source configured to illuminate an object to be imaged;
    an objective lens module having an objective lens and a hologram lens configured to focus the broadband light reflected from the object, wherein the objective lens module has a chromatic aberration that separates focal planes of different wavelengths of light, each focal plane having a different magnification;
    a two-dimensional image sensor configured to capture image data of the object;
    a two-dimensional color filter array configured to filter light reflected from the object before reaching the image sensor, wherein the filtering comprises transmitting only one band of wavelengths at certain positions in the array, and at least two bands of wavelengths are transmitted over the array;
    a range finder configured to determine a distance of the object from the image sensor; and
    a processor configured to construct a luminance plane containing an image of the object by correcting the magnification of the images for each of the different wavelengths such that each image of the object has the same height.

2. The apparatus of claim 1, wherein the color filter array is a Bayer filter, and the processor is further configured to perform a demosaicing algorithm to interpolate missing image data not transmitted by the color filter array.

3. The apparatus of claim 1, wherein the chromatic aberration of the objective lens module focuses light at longer wavelengths more strongly than light at shorter wavelengths.

4. The apparatus of claim 1, wherein the objective lens has a first dispersion and the hologram lens has a second dispersion, and the second dispersion is opposite in sign to the first dispersion.

5. The apparatus of claim 1, wherein the imaging apparatus comprises a display for displaying the image of the object in the luminance plane.

6. The apparatus of claim 1, wherein the processor decodes the image of the object in the luminance plane.

7. A method of auto-focusing an imaging system, the method comprising:
    focusing broadband light reflected from an object to be imaged through a lens module having an objective lens and a hologram lens, wherein different wavelengths of light are focused at different focal planes, each focal plane having a different magnification;
    filtering the focused light to determine contributions of light to one or more color planes;
    capturing image data of the object, wherein the image data comprises the filtered focused light;
    constructing a resultant plane for the captured image data;
    correcting the magnification for each of the different wavelengths such that the object in each of the different wavelengths has the same height in the resultant plane; and
    identifying the object imaged in the resultant plane, wherein the object imaged in the resultant plane is focused.

8. The method of claim 7, wherein filtering the focused light comprises transmitting only one contiguous group of wavelengths at certain spatial locations within the image data, and at least two contiguous groups of wavelengths are transmitted within the captured image data.

9. The method of claim 7, wherein filtering the focused light comprises:
   using a filter array to filter the focused light;
   performing a demosaicing algorithm to interpolate missing image data not transmitted by the filter array.

10. The method of claim 9, wherein the filter array is a Bayer filter.

11. The method of claim 7, wherein focusing the reflected light from the object comprises focusing longer wavelength light more strongly than shorter wavelength light.

12. The method of claim 7, comprising displaying the image of the object in the resultant plane.

13. The method of claim 7, comprising illuminating the object to be imaged using a broadband light source.

14. The method of claim 7, comprising illuminating the object to be imaged using a white light emitting diode.

15. An imaging apparatus, comprising:
   a lens module having an objective lens and a hologram lens for focusing broadband light reflected from an object to be imaged, wherein different wavelengths of light are focused at different focal planes, each focal plane having a different magnification;
   a filter array for filtering the focused light to determine contributions of light to one or more color planes;
   an image sensor for receiving image data of the object, wherein the image data comprises the filtered focused light;
   a processor configured for:
   constructing a composite plane for the captured image data;
   correcting the magnification of the images for each of the different wavelengths such that each image of the object has the same height in the composite plane;
   determining the object imaged in the composite plane, wherein the object imaged in the composite plane is focused.

16. The apparatus of claim 15, wherein the filter array comprises a color filter array.

17. The apparatus of claim 16, wherein the color filter array comprises a Bayer filter.

18. The apparatus of claim 15, wherein the image sensor comprises a two-dimensional imaging array.

* * * * *